L. A. WEISS.
CHAIN REPAIR LINK.
APPLICATION FILED MAR. 30, 1920.

1,347,725.

Patented July 27, 1920.

INVENTOR,
Leo A. Weiss
BY John A. Bommhardt
ATTY

UNITED STATES PATENT OFFICE.

LEO A. WEISS, OF CLEVELAND, OHIO.

CHAIN-REPAIR LINK.

1,347,725.     Specification of Letters Patent.     Patented July 27, 1920.

Application filed March 30, 1920. Serial No. 369,859.

*To all whom it may concern:*

Be it known that I, LEO A. WEISS, a citizen of the United States, residing at Cleveland, in the county of Cuyahoga and State of Ohio, have invented certain new and useful Improvements in Chain-Repair Links, of which the following is a specification.

This invention has for its object to provide a device which may be used to repair breaks in the solid link type of chain, and it is constructed in such a manner as to effect a quick and positive repair which will be equal in strength to any link of the chain. The construction of the same permits it to be cheaply manufactured, yet very durable and capable of withstanding the hard usage to which it may become subjected.

The invention further consists in the construction and combination of parts herein- after illustrated, described and particularly pointed out in the appended claim.

Figure 1:
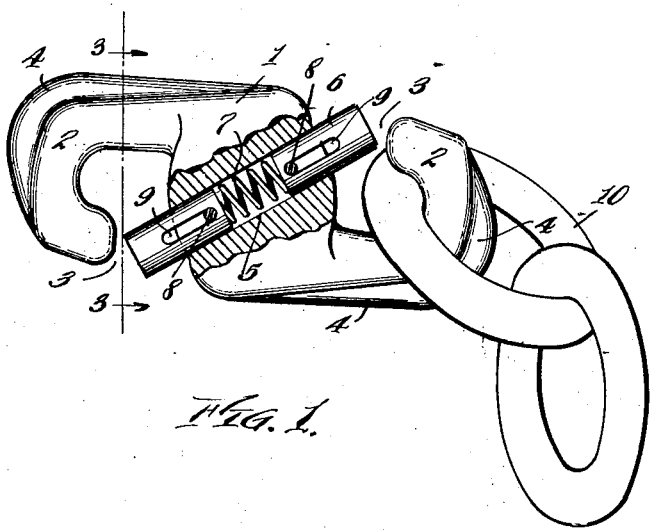
Figure 2:
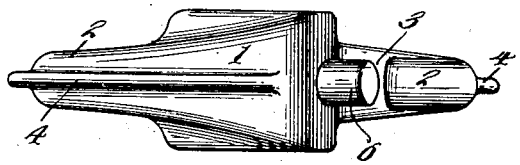
Figure 3:
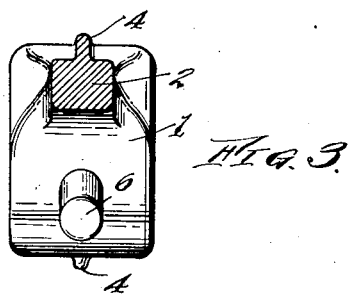

Reference is had to the accompanying drawings wherein like reference numerals designate similar parts of reference throughout the various views, wherein Figure 1 is a side elevation of a link constructed in accordance with the principles above set forth; Fig. 2 is a plan view thereof and Fig. 3 is a transverse section on the line 3—3 of Fig. 1.

The device comprises a body portion 1 which is substantially square in cross section and said body has projecting from each end thereof hooked members 2 which have their openings 3 opposed to each other and these hooked members are provided with reinforcing ribs 4. The body 1 is provided with a central angular bore 5 in line between the ends of the hooks, in which is placed a pair of pins 6. The pins are thrust in an outward direction thereby to close the aforesaid openings 3, by means of a compression spring 7 located within the bore 5 and between the inner ends of the pins and said pins are prevented from becoming displaced by means of pins 8 passing through the body and riding within longitudinal slots 9 provided therefor in the pins 6.

In operation it is only necessary to thrust the link 10 inwardly through the opening 3, pressure against its end causing the pin 6 to recede within the bore 5 sufficiently to permit the link to pass through after which the pin is immediately forced outwardly to close that opening, by the spring 7.

It is evident that the above construction is capable of being modified in various ways and I do not wish to limit myself in the construction of the same further than is required by the state of the art or that which comes within the scope of the appended claim.

I claim:

A repair link comprising a relatively heavy metal block substantially square in cross section and having oppositely presented hooks at opposite ends thereof, the opposite sides of the block projecting beyond the surface planes of the hooks, said block having a diagonal bore through the same, and spring pins working in said bore, toward and from the points of the hooks, and being presented out of alinement with said points, whereby the ends of the pins may be pressed by a link or the like to force the pins inwardly.

In testimony whereof I do affix my signature in presence of two witnesses.

LEO A. WEISS.

Witnesses:
   ROBERTSON BOWIE,
   JOHN A. BOMMHARDT.